United States Patent

Henson et al.

(10) Patent No.: US 10,690,081 B2
(45) Date of Patent: Jun. 23, 2020

(54) DIAGNOSTIC TECHNIQUES FOR A SURGE VALVE OF A TURBOCHARGED ENGINE

(71) Applicants: Scott E Henson, Chelsea, MI (US); Amarjeet Singh Sahota, Ann Arbor, MI (US); Dhaval D Shah, Rochester Hills, MI (US)

(72) Inventors: Scott E Henson, Chelsea, MI (US); Amarjeet Singh Sahota, Ann Arbor, MI (US); Dhaval D Shah, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 276 days.

(21) Appl. No.: 15/959,864

(22) Filed: Apr. 23, 2018

(65) Prior Publication Data

US 2019/0323445 A1 Oct. 24, 2019

(51) Int. Cl.
| | |
|---|---|
| *F02B 37/16* | (2006.01) |
| *F02D 41/22* | (2006.01) |
| *G07C 5/08* | (2006.01) |
| *G01L 23/24* | (2006.01) |

(52) U.S. Cl.
CPC .............. *F02D 41/22* (2013.01); *F02B 37/16* (2013.01); *G01L 23/24* (2013.01); *G07C 5/0825* (2013.01); *F02D 2200/0404* (2013.01); *F02D 2200/101* (2013.01); *F02D 2200/602* (2013.01); *F02D 2200/703* (2013.01)

(58) Field of Classification Search
CPC .. F02D 23/00; F02D 41/2403; F02D 2200/04; F02D 2200/0404; F02D 2200/101; F02D 2200/602; F02D 2200/703; F02D 2041/1432; F02B 37/16; G07C 5/0808; G07C 5/0825; G01L 23/24
See application file for complete search history.

(56) References Cited

U.S. PATENT DOCUMENTS

| | | | | |
|---|---|---|---|---|
| 6,298,718 | B1 | 10/2001 | Wang | |
| 6,857,845 | B2 * | 2/2005 | Stabley | F04D 29/464 415/1 |
| 8,272,215 | B2 * | 9/2012 | Shu | F02B 39/16 60/600 |
| 8,701,477 | B2 * | 4/2014 | Malone | F02D 41/221 73/114.77 |
| 9,194,319 | B2 * | 11/2015 | Mischler | F02D 41/18 |
| 2004/0216457 | A1 | 11/2004 | Shea et al. | |

(Continued)

*Primary Examiner* — David J Bolduc
(74) *Attorney, Agent, or Firm* — Ralph E Smith

(57) ABSTRACT

Diagnostic systems and methods for a surge valve that selectively bypasses a compressor of a turbocharger of an engine involve receiving, by a controller, a barometric pressure signal indicative of a barometric pressure external to the engine, receiving, by the controller, a throttle inlet pressure (TIP) signal indicative of an air pressure at an inlet of a throttle valve of the engine and downstream from the surge valve and the compressor, and performing, by the controller, a diagnostic technique on the surge valve, the diagnostic technique comprising generating a pressure ratio signal that is a ratio of the TIP signal to the barometric pressure signal, applying a high-pass filter to the pressure ratio signal to obtain a filtered pressure ratio signal, and based on a quantity of detected pulses in the filtered pressure ratio signal that exceed the diagnostic threshold, detecting a malfunction of the surge valve.

16 Claims, 4 Drawing Sheets

(56) References Cited

U.S. PATENT DOCUMENTS

| | | | | |
|---|---|---|---|---|
| 2004/0216519 | A1* | 11/2004 | Baeuerle | F02B 39/16 |
| | | | | 73/114.38 |
| 2008/0022968 | A1* | 1/2008 | Miyauchi | F02B 37/16 |
| | | | | 123/339.15 |
| 2012/0024274 | A1* | 2/2012 | Hakariya | F02D 41/0085 |
| | | | | 123/704 |
| 2015/0096296 | A1 | 4/2015 | Banker et al. | |
| 2016/0131065 | A1* | 5/2016 | Ossareh | F02D 41/221 |
| | | | | 701/103 |
| 2016/0160746 | A1 | 6/2016 | Banker et al. | |
| 2016/0160747 | A1 | 6/2016 | Ossareh et al. | |
| 2017/0276078 | A1* | 9/2017 | Imaizumi | F02B 37/16 |
| 2017/0298811 | A1* | 10/2017 | Santillo | F02D 41/26 |
| 2018/0075713 | A1* | 3/2018 | Henson | F02D 41/045 |
| 2019/0063347 | A1* | 2/2019 | Xiao | F02D 41/10 |
| 2019/0063348 | A1* | 2/2019 | Xiao | F02D 41/26 |
| 2019/0218988 | A1* | 7/2019 | Dudar | F02D 29/02 |

* cited by examiner

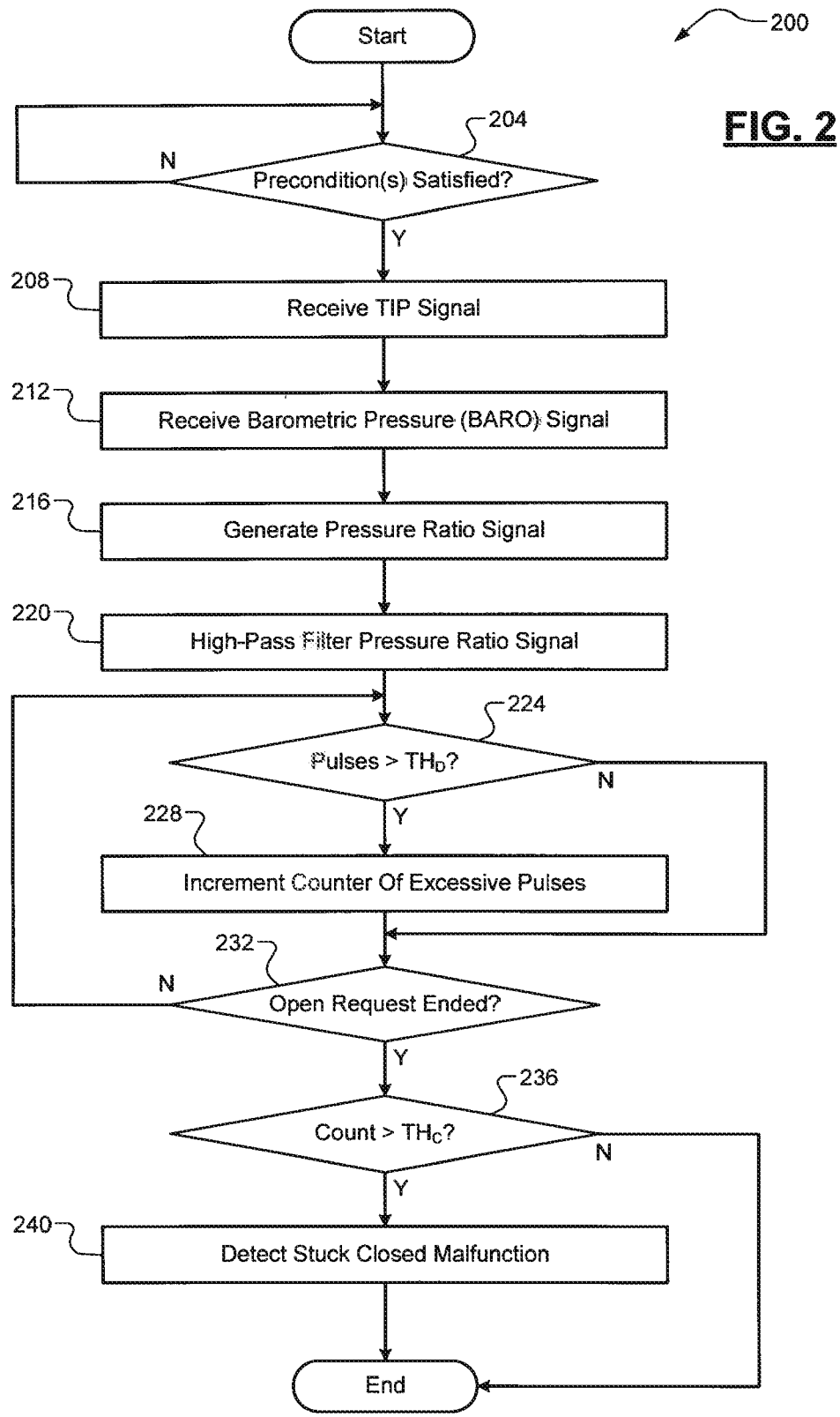

DIAGNOSTIC TECHNIQUES FOR A SURGE VALVE OF A TURBOCHARGED ENGINE

FIELD

The present application generally relates to turbocharged engines and, more particularly, to diagnostic techniques for a surge valve of a turbocharged engine.

BACKGROUND

A turbocharged engine utilizes exhaust gas energy to drive a turbine of a turbocharger. The turbine drives a compressor of the turbocharger, which forces air into the engine to increase its torque output. During transient events, such as a rapid accelerator pedal tip-in to tip-out transition, exhaust gas energy temporarily increases. This increase in exhaust gas energy causes the turbine and the compressor to spool up. After a rapid tip-in to tip-out transition, however, an engine throttle valve is closed. Air pressure at an inlet of the throttle valve increases due to the spooling of the compressor, which is also known as surge. Surge could potentially damage components in the induction system, such as the compressor. A surge valve (also known as a bypass or blow-off valve) is typically disposed to bleed off excess pressure in the induction system. Conventional diagnostics, which are required to detect when the surge valve malfunctions (e.g., stuck open or closed), are typically intrusive and thus decrease engine performance. Accordingly, while such turbocharged engine control systems work well for their intended purpose, there remains a need for improvement in the relevant art.

SUMMARY

According to one example aspect of the invention, a diagnostic system for a surge valve that selectively bypasses a compressor of a turbocharger of an engine is presented. In one exemplary implementation, the system comprises: a barometric pressure sensor configured to generate a barometric pressure signal indicative of a barometric pressure external to the engine; a throttle inlet pressure (TIP) sensor disposed downstream from the surge valve and the compressor and being configured to output a TIP signal indicative of an air pressure at an inlet of a throttle valve of the engine; and a controller configured to perform a diagnostic technique on the surge valve, the diagnostic technique comprising: generating a pressure ratio signal that is a ratio of the TIP signal to the barometric pressure signal; applying a high-pass filter to the pressure ratio signal to obtain a filtered pressure ratio signal; detecting any pulses in the filtered pressure ratio signal that exceed a diagnostic threshold; and based on a quantity of detected pulses exceeding the diagnostic threshold, detecting a malfunction of the surge valve.

In some implementations, the controller is configured to detect a set of preconditions for performing the diagnostic technique. In some implementations, the set of preconditions comprises (i) a current request to open the surge valve, (ii) a recent tip-in to tip-out transition of an accelerator device of the engine, and (iii) the throttle valve being closed. In some implementations, the set of preconditions further comprises engine speed and requested turbocharger boost being within predetermined ranges. In some implementations, a count corresponding to the quantity of detected pulses resets to zero when the surge valve is no longer requested to open.

In some implementations, the malfunction indicates that the surge valve is stuck closed. In some implementations, the controller is further configured to activate a malfunction indicator lamp (MIL) indicating a need to replace the surge valve. In some implementations, the diagnostic technique is non-intrusive in that the controller does not temporarily alter operation of the engine as part of the diagnostic technique.

According to another example aspect of the invention, a diagnostic method for a surge valve that selectively bypasses a compressor of a turbocharger of an engine is presented. In one exemplary implementation, the method comprises: receiving, by a controller and from a barometric pressure sensor, a barometric pressure signal indicative of a barometric pressure external to the engine; receiving, by the controller and from a TIP sensor disposed downstream from the surge valve and the compressor, a TIP signal indicative of an air pressure at an inlet of a throttle valve of the engine; and performing, by the controller, a diagnostic technique on the surge valve, the diagnostic technique comprising: generating a pressure ratio signal that is a ratio of the TIP signal to the barometric pressure signal; applying a high-pass filter to the pressure ratio signal to obtain a filtered pressure ratio signal; detecting any pulses in the filtered pressure ratio signal that exceed a diagnostic threshold; and based on a quantity of detected pulses exceeding the diagnostic threshold, detecting a malfunction of the surge valve.

In some implementations, the method further comprises detecting, by the controller, a set of preconditions for performing the diagnostic technique. In some implementations, the set of preconditions comprises (i) a current request to open the surge valve, (ii) a recent tip-in to tip-out transition of an accelerator device of the engine, and (iii) the throttle valve being closed. In some implementations, the set of preconditions further comprises engine speed and requested turbocharger boost being within predetermined ranges. In some implementations, a count corresponding to the quantity of detected pulses resets to zero when the surge valve is no longer requested to open.

In some implementations, the malfunction indicates that the surge valve is stuck closed. In some implementations, the method further comprises activating, by the controller, a MIL indicating a need to replace the surge valve. In some implementations, the diagnostic technique is non-intrusive in that the controller does not temporarily alter operation of the engine as part of the diagnostic technique.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a flow diagram of an example method of diagnosing a malfunction of a surge valve according to the principles of the present disclosure.

DETAILED DESCRIPTION

As discussed above, conventional surge valve diagnostics are intrusive. For example, a conventional surge valve diagnostic technique could temporarily adjust operation of the engine, such as commanding the surge valve to open when unnecessary. These techniques decrease engine performance (fuel economy, responsiveness, etc.). Accordingly, improved diagnostic techniques for a surge valve of a turbocharged engine are presented. These techniques are non-intrusive in that a controller does not temporarily alter operation of the engine as part of the diagnostic routine. These techniques monitor a pressure ratio signal that is a ratio of a throttle inlet pressure (TIP) signal to a barometric pressure signal and, after high-pass filtering the pressure ratio signal, detect pulsations in the filtered pressure ratio signal that exceed a threshold. When a count or quantity of the detected pulsations during a period while the surge valve is requested to open exceeds a threshold, a malfunction of the surge valve is detected (e.g., a stuck closed surge valve).

Figure 1:
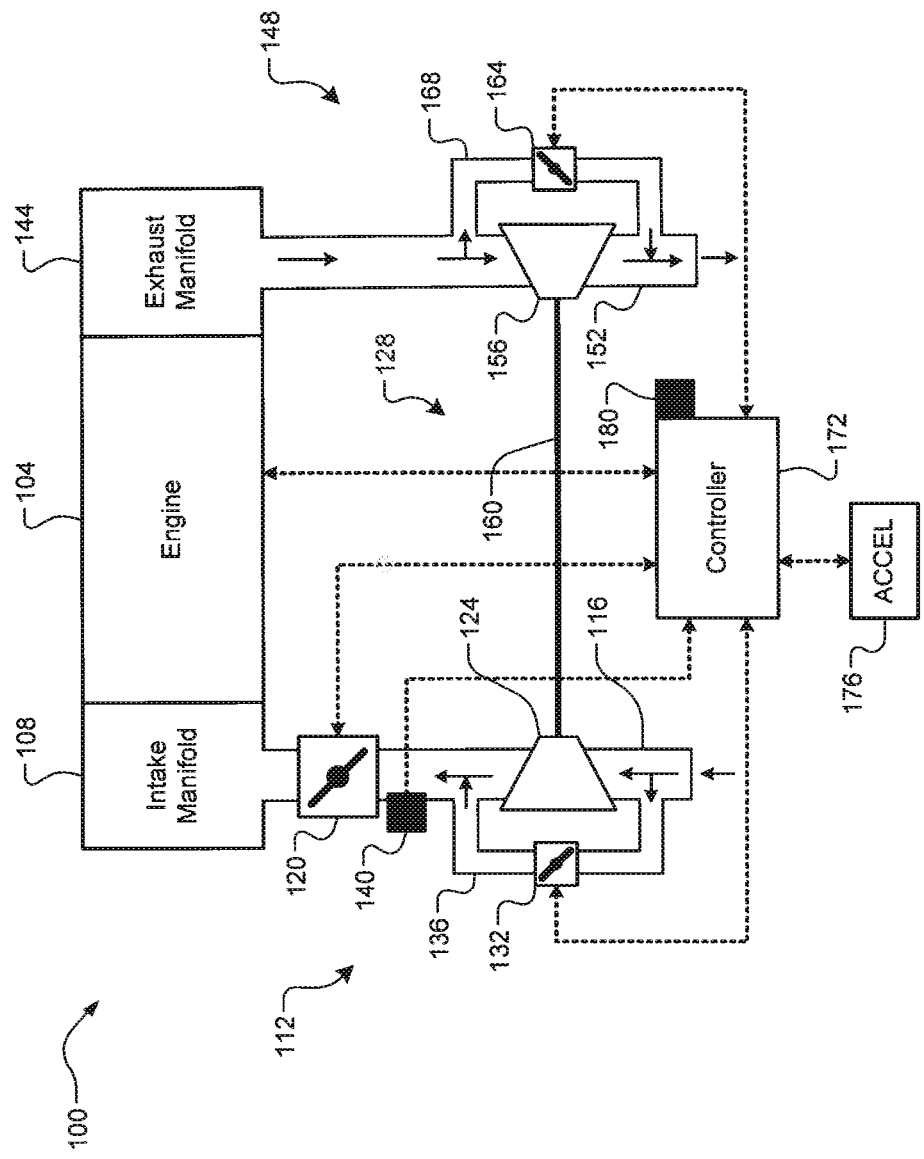
FIG. 1 is a diagram of an example vehicle having a turbocharged engine with a surge valve according to the principles of the present disclosure.

Referring now to FIG. 1, a diagram of an example vehicle 100 having a turbocharged engine 104 is illustrated. The engine 104 draws air into an intake manifold 108 through an induction system 112. The induction system 112 includes an induction passage 116 and the airflow therethrough is regulated by a throttle valve 120. The throttle valve 120 is disposed downstream from a compressor 124 of a turbocharger 128. The compressor 124 forces air through the induction passage 116. A surge valve 132 is configured to selectively bypass the compressor 124 via a surge passage 136 to control intake air pressure. A TIP sensor 140 generates a TIP signal indicative of intake air pressure at an inlet of the throttle valve 120.

The air in the intake manifold 108 is distributed to a plurality of cylinders (not shown) and combined with fuel (e.g., gasoline) to create an air/fuel mixture that is combusted to generate drive torque. Exhaust gas resulting from combustion is expelled into an exhaust manifold 144 and through an exhaust system 148. The exhaust system 148 includes an exhaust passage 152 through which the exhaust gas flows. The energy of the exhaust gas powers a turbine 156 of the turbocharger 128, which in turn drives the compressor 124 via a shaft 160 of the turbocharger 128. A wastegate valve 164 is configured to selectively bypass the turbine 156 to control exhaust gas pressure or boost. It will be appreciated that, while not shown, the exhaust system 148 could include other components such as a catalytic converter and/or an exhaust gas recirculation (EGR) system.

A controller 172 controls operation of the vehicle 100, such as controlling air and fuel supplied to the engine 104 such that the engine 104 generates enough drive torque to meet a driver torque request. The driver provides the torque request via an accelerator device (ACCEL) 176, such as an accelerator pedal. The control by the controller 172 includes, for example, controlling the throttle valve 120, the surge valve 132, and the wastegate valve 164. A barometric pressure sensor 180 is configured to generate a barometric pressure signal indicative of a barometric pressure external to the engine 104 or the vehicle 100. In one exemplary implementation, the barometric pressure sensor 180 is integrated within the controller 172, but it will be appreciated that the barometric pressure sensor 180 could be a standalone sensor.

Figure 3A:
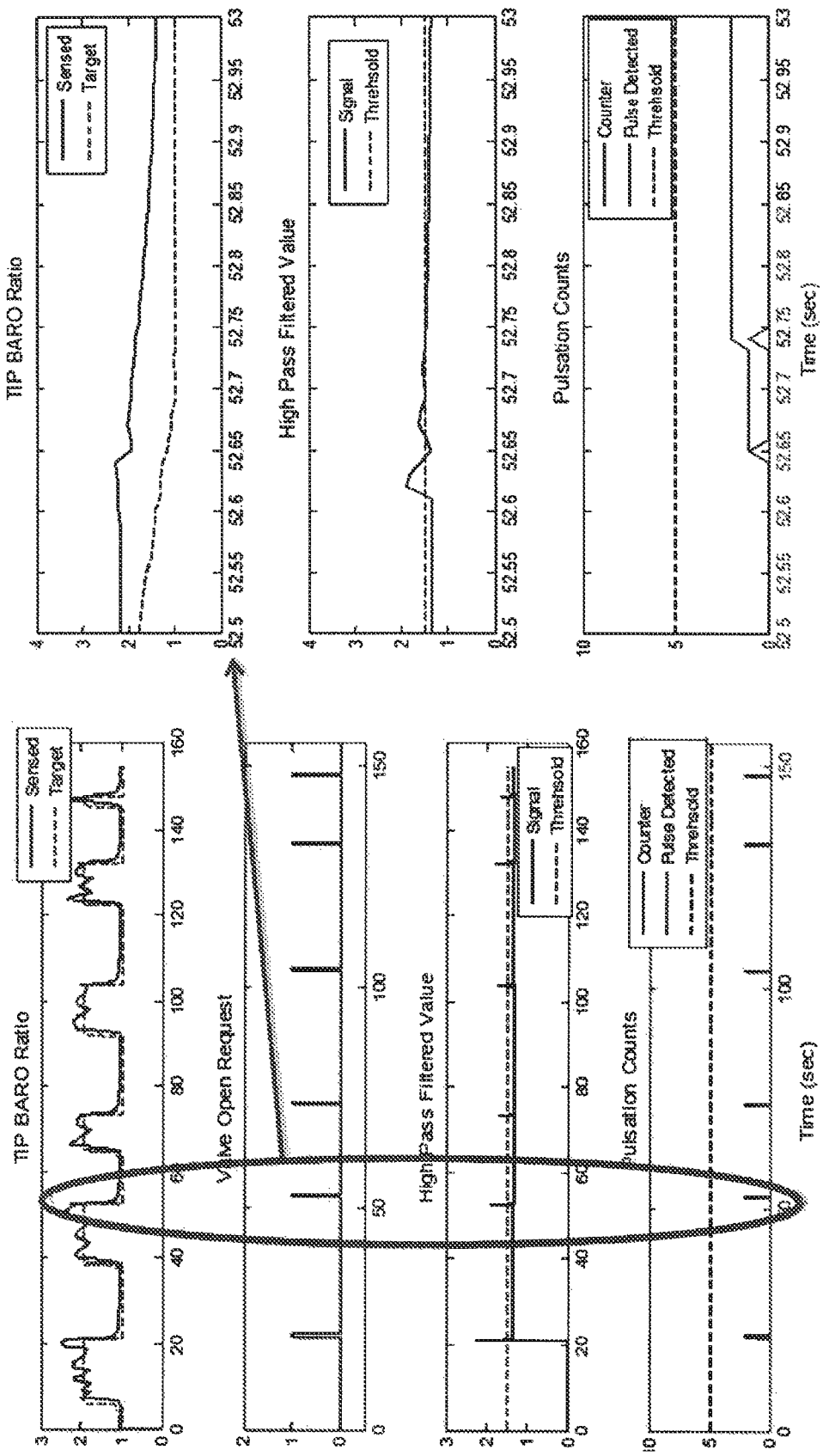
FIGS. 3A-3B are example plots of a ratio of throttle inlet pressure (TIP) to barometric pressure and pulsation counting for normal and stuck closed malfunction scenarios for the surge valve according to the principles of the present disclosure.
Figure 3B:
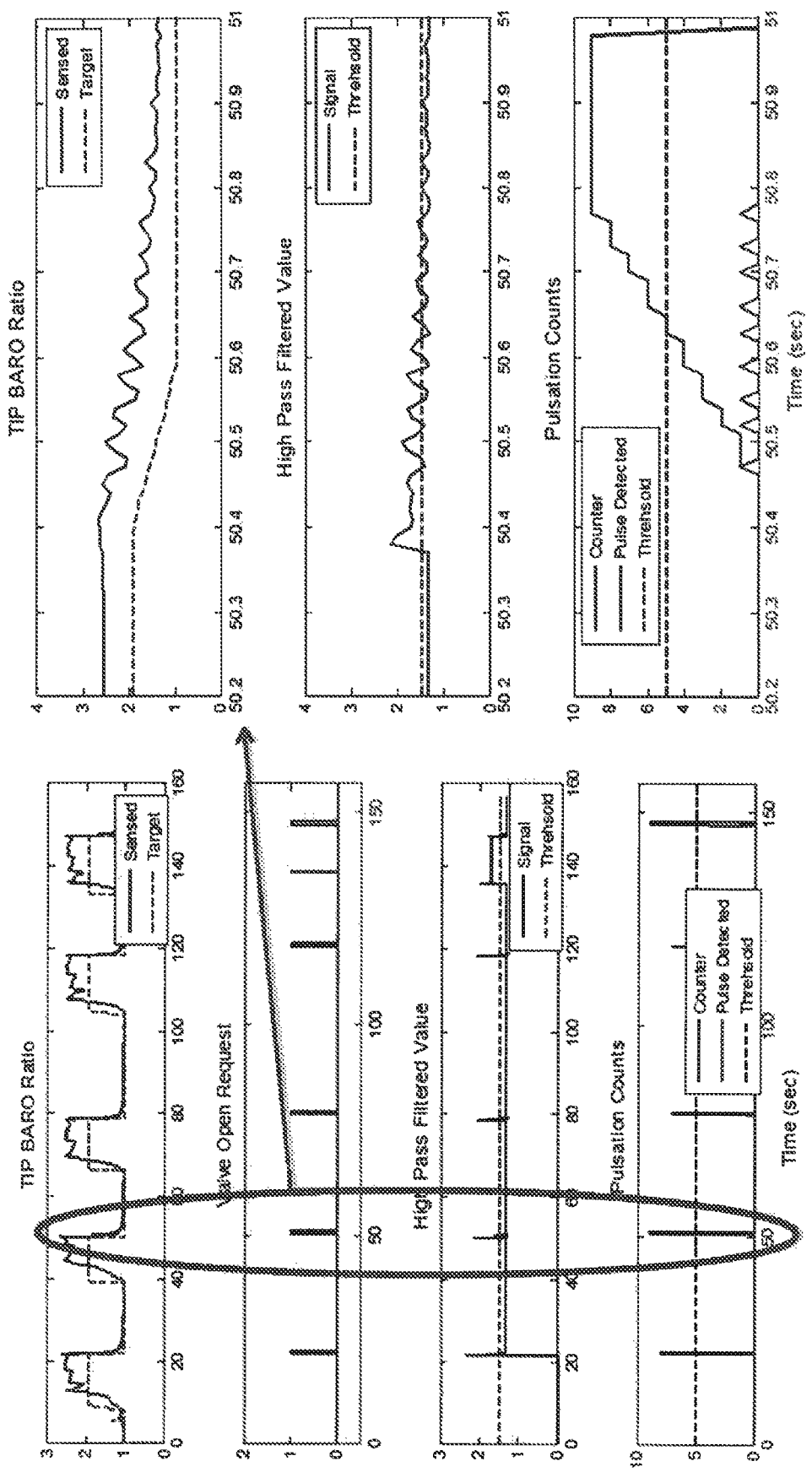

Referring now to FIGS. 2 and 3A-3B, a flow diagram of an example diagnostic method 200 for the surge valve 132 and plots 300, 350 of TIP to barometric pressure ratio and pulsation counting for normal and stuck closed malfunction scenarios for the surge valve 132. At 204, the controller 172 determines whether a set of preconditions are satisfied. Non-limiting examples of these preconditions include a current request to open the surge valve 132, (ii) a recent tip-in to tip-out transition of the accelerator device 176, and (iii) the throttle valve 120 being closed. The set of preconditions could further include engine speed and requested turbocharger boost being stable or within predetermined ranges. When the set of preconditions are satisfied, the method 200 proceeds to 208. Otherwise, the method 200 ends or returns to 204. At 208, the controller 172 receives the TIP signal from the TIP sensor 140. At 212, the controller 172 receives the barometric pressure signal from the barometric pressure sensor 180. At 216, the controller 172 generates a pressure ratio signal that is a ratio of the TIP signal to the barometric pressure signal. At 220, the controller 172 applies a high-pass filter to the pressure ratio signal to focus on the high-frequency noise that is indicative of the status of the surge valve 132. The plots 300, 350 in FIGS. 3A-3B illustrate zoomed in portions of the pressure ratio signal (TIP signal to barometric pressure, or BARO signal) and the filtered pressure ratio signal.

At 224, the controller 172 detects any pulses/pulsations in the filtered pressure ratio signal that exceed a diagnostic threshold ($TH_D$). This diagnostic threshold is a calibratable threshold and could vary across different vehicle applications. FIG. 3A, for example, illustrates a normal or non-malfunctioning surge valve. As shown, there are zero or minimal pulsations exceeding the diagnostic threshold. At 228, the controller 172 increments a counter (Count) for the detected pulses. At 232, the controller 172 determines whether an open request for the surge valve 132 has ended. When true, the method 200 proceeds to 236. Otherwise, the method 200 returns to 224 and the pulsation monitoring continues. At 236, the controller 172 determines whether the count exceeds a count threshold ($TH_C$). This count threshold is also a calibratable threshold and could vary across different vehicle applications. When the count exceeds the count threshold, the method 200 proceeds to 240 where the controller 172 detects a stuck closed malfunction of the surge valve 132 and the counter is reset. FIG. 3B, for example, illustrates a stuck closed malfunction of the surge valve 132. Otherwise, the method 200 ends or returns to 204 and the counter is reset.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A diagnostic system for a surge valve that selectively bypasses a compressor of a turbocharger of an engine, the system comprising:
   a barometric pressure sensor configured to generate a barometric pressure signal indicative of a barometric pressure external to the engine;
   a throttle inlet pressure (TIP) sensor disposed downstream from the surge valve and the compressor and being configured to output a TIP signal indicative of an air pressure at an inlet of a throttle valve of the engine; and
   a controller configured to perform a diagnostic technique on the surge valve, the diagnostic technique comprising:
      generating a pressure ratio signal that is a ratio of the TIP signal to the barometric pressure signal;
      applying a high-pass filter to the pressure ratio signal to obtain a filtered pressure ratio signal;
      detecting any pulses in the filtered pressure ratio signal that exceed a diagnostic threshold; and
      based on a quantity of detected pulses exceeding the diagnostic threshold, detecting a malfunction of the surge valve.

2. The system of claim 1, wherein the controller is configured to detect a set of preconditions for performing the diagnostic technique.

3. The system of claim 2, wherein the set of preconditions comprises (i) a current request to open the surge valve, (ii) a recent tip-in to tip-out transition of an accelerator device of the engine, and (iii) the throttle valve being closed.

4. The system of claim 3, wherein the set of preconditions further comprises engine speed and requested turbocharger boost being within predetermined ranges.

5. The system of claim 3, wherein a count corresponding to the quantity of detected pulses resets to zero when the surge valve is no longer requested to open.

6. The system of claim 1, wherein the malfunction indicates that the surge valve is stuck closed.

7. The system of claim 6, wherein the controller is further configured to activate a malfunction indicator lamp (MIL) indicating a need to replace the surge valve.

8. The system of claim 1, wherein the diagnostic technique is non-intrusive in that the controller does not temporarily alter operation of the engine as part of the diagnostic technique.

9. A diagnostic method for a surge valve that selectively bypasses a compressor of a turbocharger of an engine, the method comprising:
   receiving, by a controller and from a barometric pressure sensor, a barometric pressure signal indicative of a barometric pressure external to the engine;
   receiving, by the controller and from a throttle inlet pressure (TIP) sensor disposed downstream from the surge valve and the compressor, a TIP signal indicative of an air pressure at an inlet of a throttle valve of the engine; and
   performing, by the controller, a diagnostic technique on the surge valve, the diagnostic technique comprising:
      generating a pressure ratio signal that is a ratio of the TIP signal to the barometric pressure signal;
      applying a high-pass filter to the pressure ratio signal to obtain a filtered pressure ratio signal;
      detecting any pulses in the filtered pressure ratio signal that exceed a diagnostic threshold; and
      based on a quantity of detected pulses exceeding the diagnostic threshold, detecting a malfunction of the surge valve.

10. The method of claim 9, further comprising detecting, by the controller, a set of preconditions for performing the diagnostic technique.

11. The method of claim 10, wherein the set of preconditions comprises (i) a current request to open the surge valve, (ii) a recent tip-in to tip-out transition of an accelerator device of the engine, and (iii) the throttle valve being closed.

12. The method of claim 11, wherein the set of preconditions further comprises engine speed and requested turbocharger boost being within predetermined ranges.

13. The method of claim 11, wherein a count corresponding to the quantity of detected pulses resets to zero when the surge valve is no longer requested to open.

14. The method of claim 9, wherein the malfunction indicates that the surge valve is stuck closed.

15. The method of claim 14, further comprising activating, by the controller, a malfunction indicator lamp (MIL) indicating a need to replace the surge valve.

16. The method of claim 9, wherein the diagnostic technique is non-intrusive in that the controller does not temporarily alter operation of the engine as part of the diagnostic technique.

* * * * *